US008433862B2

(12) United States Patent
Aigo

(10) Patent No.: US 8,433,862 B2
(45) Date of Patent: Apr. 30, 2013

(54) STORAGE SYSTEM FOR ADJUSTING ASYNCHRONOUS COPY LOAD BASED ON CACHE ACTIVITY RATE

(75) Inventor: Takao Aigo, Tokyo (JP)

(73) Assignee: NEC Corporation, Tokyo (JP)

( * ) Notice: Subject to any disclaimer, the term of this patent is extended or adjusted under 35 U.S.C. 154(b) by 813 days.

(21) Appl. No.: 11/633,538

(22) Filed: Dec. 5, 2006

(65) Prior Publication Data

US 2007/0130432 A1 Jun. 7, 2007

(30) Foreign Application Priority Data

Dec. 6, 2005 (JP) .................................. 2005-352387

(51) Int. Cl.
*G06F 12/16* (2006.01)
(52) U.S. Cl.
USPC ........................... 711/162; 711/113; 711/156
(58) Field of Classification Search .................. 711/156; 709/217
See application file for complete search history.

(56) References Cited

U.S. PATENT DOCUMENTS

| 6,230,239 | B1 | 5/2001 | Sakaki et al. | |
|---|---|---|---|---|
| 6,684,306 | B1 * | 1/2004 | Nagasawa et al. | ............ 711/162 |
| 7,543,121 | B2 | 6/2009 | Maki et al. | |
| 2003/0023815 | A1 * | 1/2003 | Yoneyama et al. | ............ 711/133 |
| 2003/0084251 | A1 * | 5/2003 | Gaither et al. | ................ 711/133 |
| 2004/0117554 | A1 * | 6/2004 | Raghavan | ....................... 711/118 |
| 2004/0128404 | A1 * | 7/2004 | Cochran | ........................... 710/5 |
| 2005/0114467 | A1 * | 5/2005 | Ikegaya et al. | ................ 709/217 |
| 2005/0144380 | A1 * | 6/2005 | Suzuki et al. | ................ 711/113 |
| 2005/0154829 | A1 | 7/2005 | Maki et al. | |
| 2009/0216976 | A1 | 8/2009 | Maki et al. | |

FOREIGN PATENT DOCUMENTS

| JP | 10-171605 | 6/1998 |
|---|---|---|
| JP | 11-242567 | 9/1999 |
| JP | 2003-6016 | 1/2003 |
| JP | 2005-196618 | 7/2005 |

OTHER PUBLICATIONS

Japanese Patent Office issued a Japanese Office Action dated Dec. 8, 2009, Application No. 2005-352387.
Japanese Patent Office issued a Japanese Office Action dated Apr. 13, 2010, Application No. 2005-352387.

* cited by examiner

*Primary Examiner* — Kevin Verbrugge
(74) *Attorney, Agent, or Firm* — Young & Thompson

(57) ABSTRACT

A storage system comprises a remote side storage device comprising a cache memory, and a master side storage device comprising an asynchronous copy controller constructed and arranged so as to issue requests for storage of asynchronous copies to the remote side storage device. The master side storage device further comprises a remote side status monitoring section constructed and arranged to monitor an activity rate of the cache memory and to adjust an asynchronous copy load based on the activity rate of the cache memory.

19 Claims, 8 Drawing Sheets

| ACTIVITY RATE OF CACHE MEMORY AT REMOTE SIDE DEVICE | INTERVAL OF ISSUING ASYNCHRONOUS COPY COMMAND | NUMBER OF ISSUING ASYNCHRONOUS COPY COMMAND |
|---|---|---|
| LOW | SHORT | HIGH |
| MEDIUM | MEDIUM | MEDIUM |
| HIGH | LONG | LOW |

| ACTIVITY RATE OF CACHE MEMORY AT REMOTE SIDE DEVICE | INTERVAL OF ISSUING ASYNCHRONOUS COPY COMMAND | NUMBER OF ISSUING ASYNCHRONOUS COPY COMMAND |
|---|---|---|
| LOW | SHORT | HIGH |
| RELATIVELY LOW | RELATIVELY SHORT | RELATIVELY HIGH |
| MEDIUM | MEDIUM | MEDIUM |
| RELATIVELY HIGH | RELATIVELY LONG | RELATIVELY LOW |
| HIGH | LONG | LOW |

STORAGE SYSTEM FOR ADJUSTING ASYNCHRONOUS COPY LOAD BASED ON CACHE ACTIVITY RATE

BACKGROUND OF THE INVENTION

1. Field of the Invention

The present invention relates to a storage system for copying data between a plurality of storage devices, a storage device in this system, a method of copying data between a plurality of storage devices, and a medium recording a program for copying data between a plurality of storage devices. In particular, the present invention relates to a case where a synchronous copy process and an asynchronous copy process coexist. The synchronous copy process is to copy in synchronization with I/O (hereinafter, referred to as host I/O) carried out by a host computer (hereinafter, referred to as a host) and, the asynchronous copy process is to copy in asynchronization with the host I/O.

2. Description of the Related Art

There are storage devices with the function to copy data between storage devices to make a backup copy for recovery in case physical disk failures or any other accidents should occur. This function is to copy data of a storage device (hereinafter, referred to as a master side device), to which a host is directly connected, to another storage device (hereinafter, referred to as a remote side device) which is connected indirectly to the host via the master side device and an interface cable. When data has been copied to the remote side device in advance for a backup and recovery, the system can be restored to continue the services even when the data of the master side device cannot be read due to a failure or the like of a physical disk, or the entire master side device fails due to an accident or the like.

The method of copying data between storage devices include a synchronous copy method of copying to a remote side device in synchronization with host I/O, and an asynchronous copy method of copying to a remote side device in asynchronization with the host I/O. In the synchronous copy method, at the time of a write request from the host, data is written to a volume of the master side device (hereinafter, referred to as a master volume) and concurrently, the same data is written to a volume of the remote side device (hereinafter, referred to as a copy volume). Then, after completing the writing at the remote side device, the master side device returns a completion response of the host I/O to the host. In this method, the contents of the master volume are always identical to those of the copy volume. This is the method used in a case where the latest data is at all times required when a failure occurs.

On the other hand, in the asynchronous copy method, a completion response of host I/O is returned to the host when data has been written to the master volume. Subsequently, the data is sent to the remote side device, and is written to the copy volume. Although this method causes a delay in making the data of the copy volume identical to that of the master volume, this is the method used in a system in which the above delay is allowed.

Japanese Patent Application No. 2003-6016 (hereinafter referred to as Patent Document 1) discloses that, in a state where asynchronous copy cannot be performed, copy to a logical volume with a high priority is continued, but copy to a logical volume with a low priority is halted.

In either case of the synchronous copy method or of the asynchronous copy method, when there is a space available in a cache memory of the remote side device, the completion response of copying is returned to the master side device when the data is written to the cache memory. Thereafter, the copy process is terminated.

However, when there is no space available in the cache memory of the remote side device, the remote side device firstly writes the data on the cache memory and has not been written to a physical disk, to the physical disk to make space available in the cache memory. Thereafter, the remote side device writes the data to this space in the cache memory, returns a completion response of copying to the master side device, and terminates the copy process.

Hereinafter, descriptions of the above process are provided with reference to FIG. 6. After a copy process is started in the remote side device, when there is a space available in the cache memory (YES at S601), the data is written to the cache memory (S603). Then a completion notification on the copying is sent to the master side device (S604).

When there is no space in the cache memory (NO at 601), the data, which has not been written to the physical disk among the data in the cache memory, is written to the physical disk (S602) to make space in the cache memory. Subsequently, the data is written to the cache memory (S663) and the completion notification on the writing is sent to the master side device (S604). In this case the completion notification on the copying is delayed because the data is written to the physical disk (S602). For this reason, the completion response of the host I/O, which is carrying out the synchronous copy process, to the host is also delayed.

Accordingly, in the case where the synchronous copy process and the asynchronous copy process coexist, there is a problem. The response of the synchronous copy process is delayed under the influence of the write load due to the asynchronous copy process. So the completion response of the host I/O, when carrying out the synchronous copy process, is also delayed. This problem has not been solved even by means of the technique disclosed in Patent Document 1 described above.

SUMMARY OF THE INVENTION

The present invention is advantageous especially when a synchronous copy method and an asynchronous copy method coexist. Especially when there is a large amount of write load at the remote side device and there is little space available in the cache memory. Specifically, the present invention minimizes the completion delay of the synchronous copy process caused by the asynchronous copy. This minimizes the completion delay of the host I/O which is executing the synchronous copy.

This can be achieved because the activity rate of the cache memory of the remote side device is monitored, and the asynchronous copy load, which is the amount of I/O process cased by asynchronous copies, is adjusted based on the activity rate of the cache memory.

According to the present invention, there is provided a storage system comprising a remote side storage device comprising a cache memory, and a master side storage device comprising an asynchronous copy controller constructed and arranged so as to issue requests for storage of asynchronous copies to the remote side storage device, wherein the master side storage device further comprises a remote side status monitoring section constructed and arranged to monitor an activity rate of the cache memory and to adjust an asynchronous copy load based on the activity rate of the cache memory.

According to the present invention, there is provided a master side storage device comprising an asynchronous copy controller constructed and arranged to issue requests for asynchronous copies to be created on a remote side storage device, the remote side storage device being separate from the master side storage device and comprising a cache memory, and a remote side status monitoring section constructed and arranged to monitor an activity rate of the cache memory and to adjust an asynchronous copy load based on the activity rate of the cache memory.

According to the present invention, there is provided a remote side storage device comprising a cache memory, and a cache memory status monitoring section which is constructed and arranged to check an activity rate of the cache memory, wherein the remote side storage device is constructed and arranged to issue data describing the activity rate of the cache memory upon request, so that when the activity rate is requested by a master side storage device having an asynchronous copy controller designed to request asynchronous copies to be made on the remote side storage device, a remote side status monitoring section further provided in the master side storage device can monitor the activity rate of the cache memory and adjust an asynchronous copy load based on the activity rate of the cache memory.

According to the present invention, there is provided a computer system comprising above-mentioned storage system, a first host computer connected to the master side storage device, and a second host computer connected to the remote side storage device.

According to the present invention, there is provided a data copy method comprising requesting asynchronous copies to be made on a remote side storage device, monitoring an activity rate of a cache memory of the remote side storage device and adjusting an asynchronous copy load based on the activity rate of the cache memory.

According to the present invention, there is provided a computer readable medium storing thereon a control program enabling a computer to execute a data copy method descried above.

DETAILED DESCRIPTION OF THE INVENTION

Next, the best mode for implementing the present invention will be described in detail with reference to the accompanying drawings.

Figure 1:
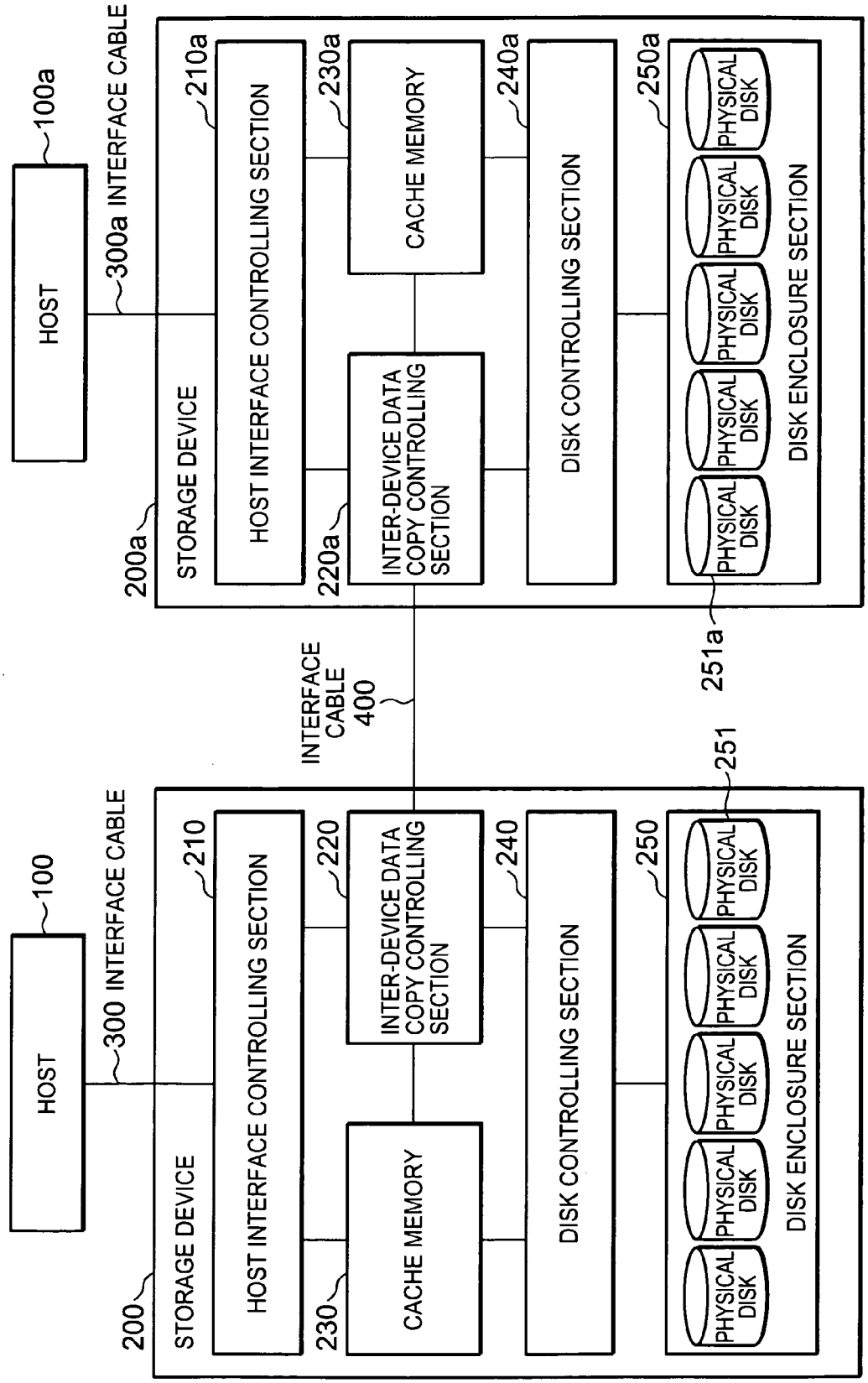
FIG. 1 is a block diagram showing an example of the entire configuration of a storage system of the present invention.

First, detailed descriptions will be provided for a configuration of an embodiment of the present invention with reference to the accompanying drawings. Referring to FIG. 1, a storage device 200 as a master side device of the embodiment of the present invention includes a host interface controlling section 210, an inter-device data copy controlling section 220, a cache memory 230, a disk controlling section 240, and a disk enclosure section 250.

A plurality of physical disks 251 are mounted in the disk enclosure section 250. The host interface controlling section 210 is connected to a host 100 via an interface cable 300. In the storage device 200 at the master side (hereinafter, simply referred to also as a master side device) and a storage device 200a at a remote side (hereinafter, simply referred to also as a remote side device), the inter-device data copy controlling section 220 of the storage device 200 is connected to an inter-device data copy controlling section 220a of the storage device 200a via an interface cable 400.

Moreover, the remote storage device 200a includes a host interface controlling section 210a, the inter-device data copy controlling section 220a, a cache memory 230a, a disk controlling section 240a, and a disk enclosure section 250a.

A plurality of physical disks 251a is mounted in the disk enclosure section 250a. The host interface controlling section 210a is connected to a host 100a via an interface cable 300a.

The host interface controlling sections 210 and 210a transmit and receive commands or responses thereof, as well as the data, to/from the hosts 100 and 100a, respectively.

The disk controlling section 240 issues a write instruction of the data sent from the host 100, to the physical disks 251 in response to a write request command from the host 100. Moreover, the disk controlling section 240 issues an instruction to write the un-written data on the cache memory 230 to the physical disks 251.

The disk enclosure sections 250 and 250a respectively include the physical disks 251 and 251a, and read, write and store the data.

Figure 2:
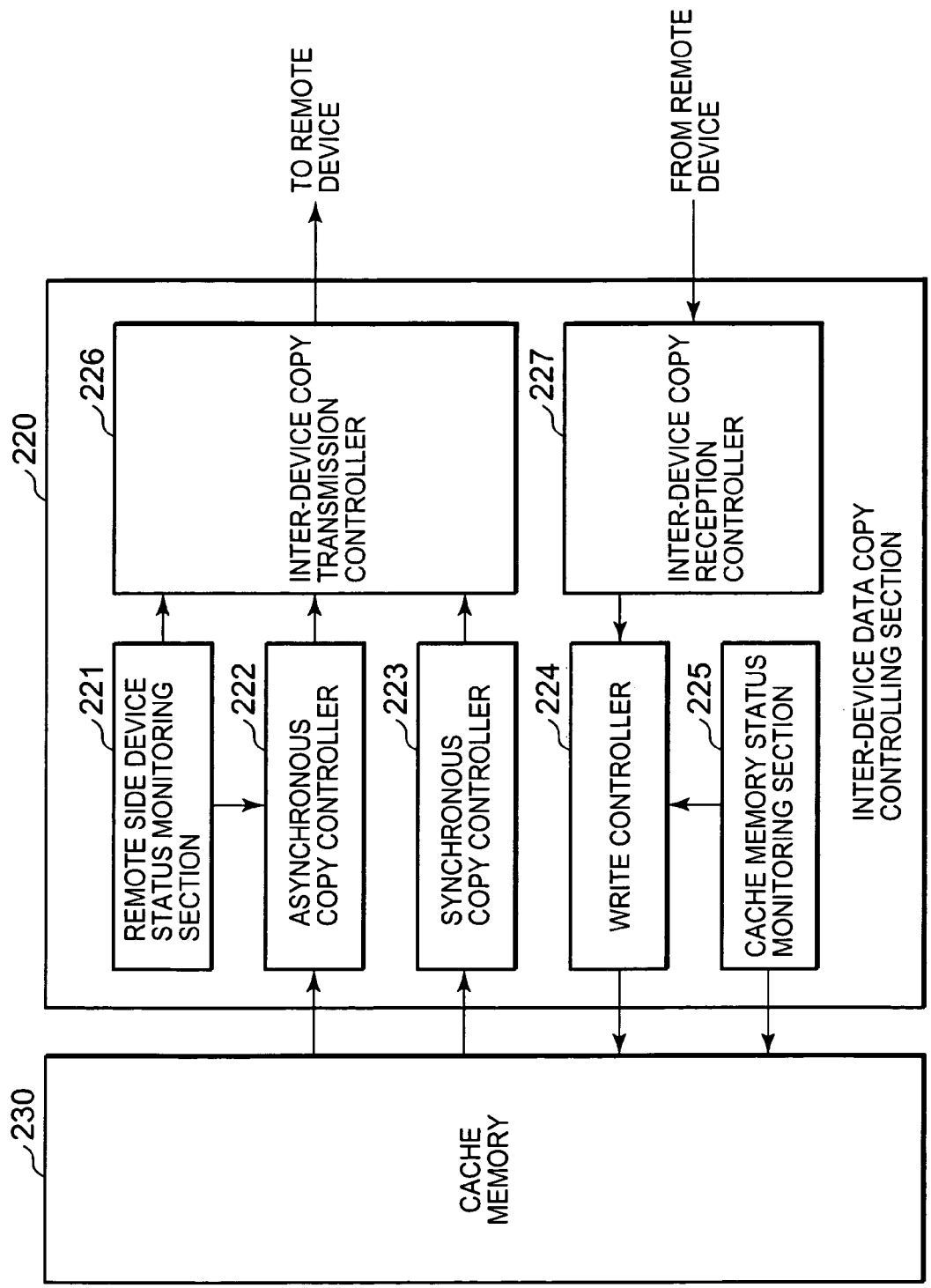
FIG. 2 is a block diagram showing an example of the configuration of an inter-device data copy controlling section of a master side device of the storage system of the present invention.

FIG. 2 shows in detail the inside of the inter-device data copy controlling section 220. Referring to FIG. 2, the inter-device data copy controlling section 220 includes a remote side device status monitoring section 221, an asynchronous copy controller 222, a synchronous copy controller 223, a write controller 224, a cache memory status monitoring section 225, an inter-device copy transmission controller 226, and an inter-device copy reception controller 227. The inter-device copy transmission controller 226 and the inter-device copy reception controller 227 are connected to the remote side device via the interface cables 400.

Figure 10:
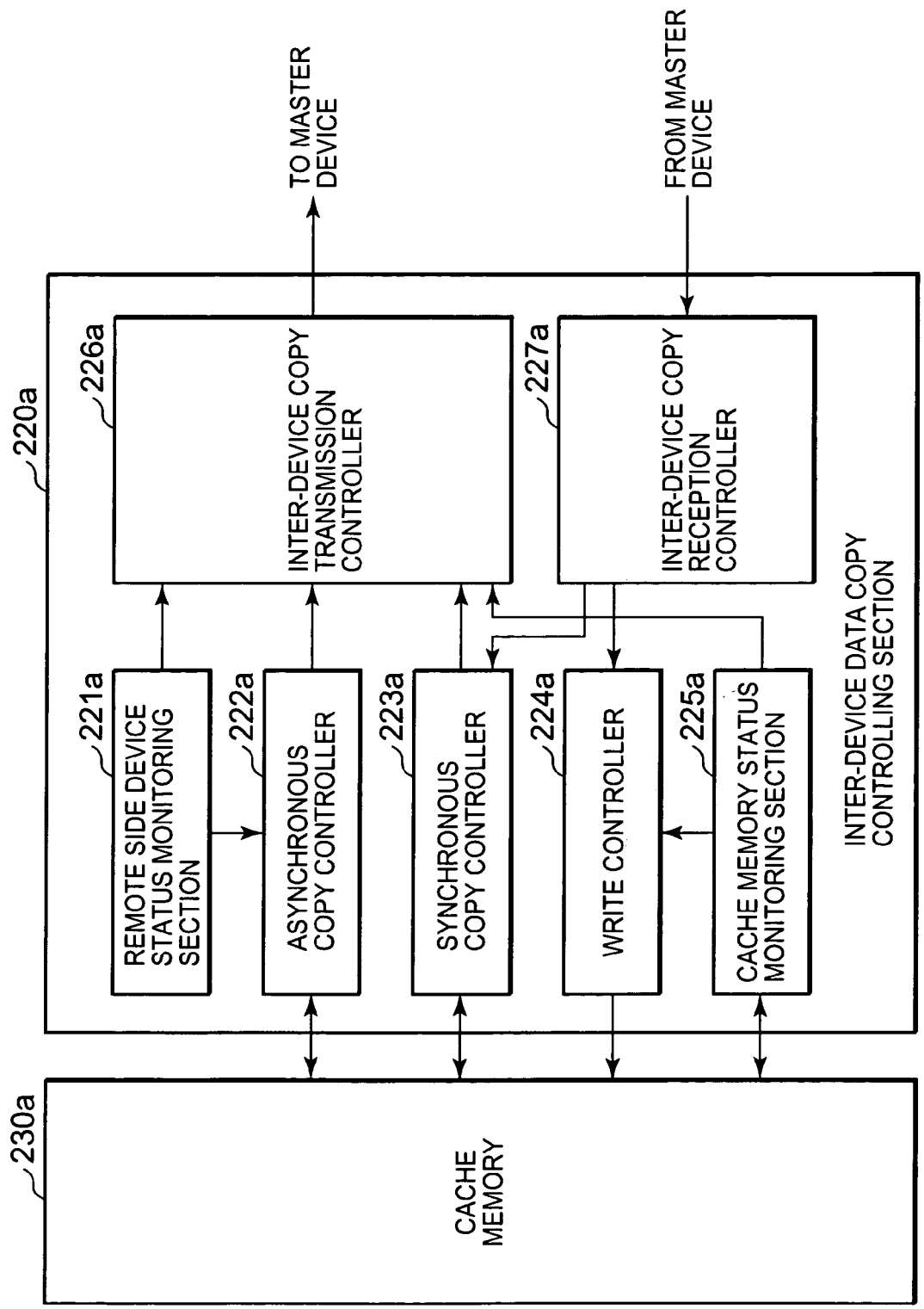
FIG. 10 is a block diagram showing an example of the configuration of the inter-device data copy controlling section of the remote side device of the storage system of the present invention.

FIG. 10 shows in detail the inside of the inter-device data copy controlling section 220a. Referring to FIG. 10, the inter-device data copy controlling section 220a includes a remote side device status monitoring section 221a, an asynchronous copy controller 222a, a synchronous copy controller 223a, a write controller 224a, a cache memory status monitoring section 225a, an inter-device copy transmission controller 226a, and an inter-device copy reception controller 227a. The inter-device copy transmission controller 226a and the inter-device copy reception controller 227a are connected to the master side device via the interface cables 400.

Subsequently, the operation of the embodiment of the present invention is described with reference to the accompanying drawings. First, referring to FIG. 1, descriptions will be provided for the operation and function of the storage device 200 at the master side. The host interface controlling section 210 checks the availability in the cache memory 230 when a command of write request is received from the host 100.

When there is a space available, the data, which is received from the host 100, is written to the cache memory 230. Thereafter, a response of normal termination of writing is returned to the host 100. Accordingly, the data, which is written to the cache memory 230, is written to the physical disks 251 in asynchronization with the write request command from the above-described host 100. For example, the disk controller 240 checks the cache memory 230 in asynchronization with the write request command from the above-described host 100 and, when the data is yet to be written, the disk controlling section 240 writes this data to the physical disks 251, and deletes the data from the cache memory 230.

On the other hand, in a case where there is no space in the cache memory 230 when a command of write request is received from the host 100, the host interface controlling section 210 issues, to the disk controller 240, an instruction to write the un-written data on the cache memory 230 to the physical disk 251. After having written the un-written data on the cache memory 230 to the physical disks 251, the disk controller 240 deletes the data from on the cache memory 230, and notifies the host interface controller 210 of the completion of writing.

The host interface controlling section 210, which has received this notice, writes, to the cache memory 230, the data received from the host 100, and returns, to the host 100, a response of completion of writing. In this manner, time for responding to the host 100 is shortened when there is a space available in the cache memory 230.

The operation and function of the storage device 200a at the remote side are identical to those of the storage device 200.

Next, the operation of the inter-device data copy of the present invention is described with reference to FIG. 1 and FIG. 2. First, descriptions will be provided for the synchronous copy method of copying to the remote side device in synchronization with the host I/O. In this case, when there is a space available in the cache memory 230, the host interface controlling section 210, which has received a write request command from the host 100, writes the received data to the cache memory 230, and concurrently, notifies the synchronous copy controller 223 of the completion of writing. The synchronous copy controller 223, which has received this notice, reads the relevant data from the cache memory 230, and sends this data to the storage device 200a at the remote side via the inter-device copy transmission controller 226.

In a case where there is no space in the cache memory 230 when a write request command is received from the host 100, the host interface controlling section 210 issues, to the disk controller 240, an instruction to write the data, which is on the cache memory 230 and has not been written to the physical disks, to the physical disks 251. The disk controlling section 240 writes the relevant data to the physical disks. Upon completion of this writing, the disk controlling section 240 deletes the relevant data from the cache memory 230 to make space available, and notifies the host interface controlling section 210 of the completion of writing.

The host interface controlling section 210, which has received this notice, writes, to the cache memory 230, the data received from the host 100, and concurrently, notifies the synchronous copy controller 223 of the writing. The operation thereafter is similar to that of the case where there is a space in the memory. Specifically, the synchronous copy controller 223, which has received the notice, reads the relevant data from the cache memory 230, and sends this data to the storage device 200a at the remote side via the inter-device copy transmission controller 226.

When the completion response of writing of the relevant data is received from the remote side device 200a, the inter-device copy reception controller 227 notifies the synchronous copy controller 223 of the completion of writing. The synchronous copy controller 223, which has received this notice, notifies the host interface controlling section 210 of the completion of writing. Upon receipt of this notice, the host interface controlling section 210 returns, to the host 100, a response of completion of writing.

Next, descriptions will be provided for an asynchronous copy method of copying to the remote side device in asynchronization with the host I/O. Upon receipt of the write request command from the host 100, the host interface controlling section 210 writes the received data to the cache memory 230. Concurrently, the host interface controlling section 210 holds information indicating the existence of a different information (in this case, the data received under the write request command from the host 100) between the data of the master side storage device 200 and the data of the remote side storage device 200a, e.g., an address in the cache, to which the relevant data has been written. Thereafter, the host interface controlling section 210 returns a response of completion of writing to the host 100.

The asynchronous copy controller 222 checks the different information periodically. When the different information exists, the asynchronous copy controller 222 issues a copy command to the remote side device to request an asynchronous copy thereto. In the process, asynchronous copy controller 222 reads the different information from the cache memory 230 and sends this data to the remote side device 200a via the inter-device copy transmission controller 226. Upon receipt of a response (response of normal termination) to the data transmission of the relevant different information from the remote side device 200a, the inter-device copy reception controller 227 notifies the asynchronous copy controller 222 of this fact. The asynchronous copy controller 222 receives the notice, and completes the copy process.

Figures 8, 9:
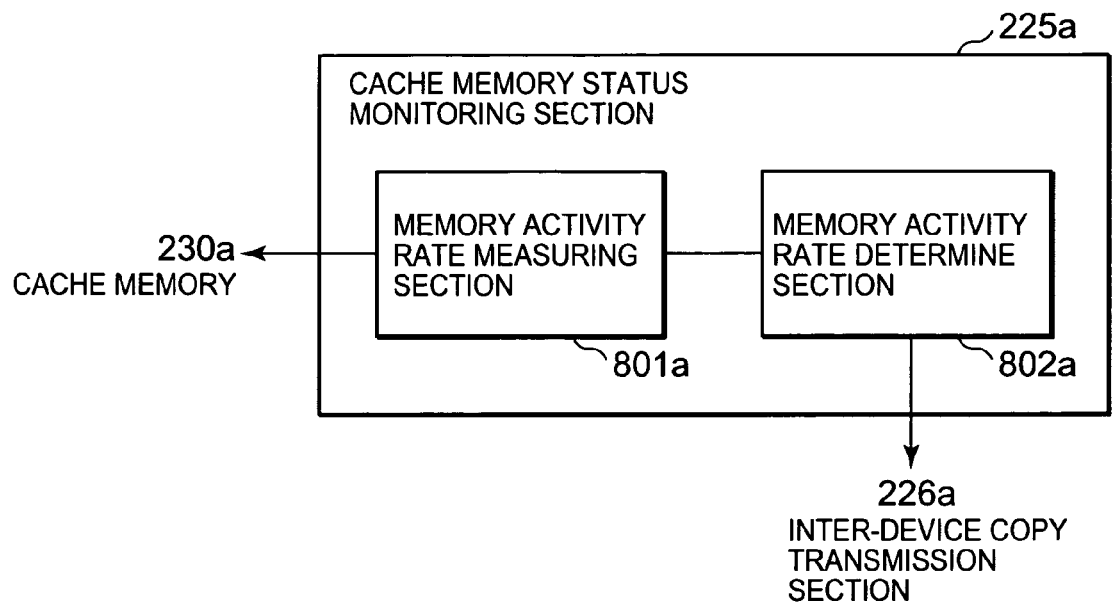
FIG. 8 is a block diagram showing an example of the configuration of a cache memory status monitoring section of the present invention.
FIG. 9 is a table showing another example of the table to which the remote side device status monitoring section of the present invention refers.

As shown in FIG. 8, a cache memory status monitoring section 225a at the remote side includes a memory activity rate measuring section 801a for measuring the activity rate of the cache, and a memory activity rate determination section 802a for determining the degree of the activity rate, e.g., the memory activity rate determination section 802a for determination whether the memory activity rate is low, or medium, or high. The degree of the activity rate may be divided not only into three levels of low, medium and high as described above, but also may be divided into five levels of low, relatively low, medium, relatively high, and high as shown FIG. 9. The degree of the activity rate may be divided into more detailed levels.

In the cache memory status monitoring section 225a, a counter provided therein counts up the numbers every time the data is written on a new page of cache memory 230a, and counts down the numbers every time the data on cache memory 230 is written down to the physical disks 251a. Accordingly, the value of the counter expresses the number of the pages used in the cache. It can also be said that the value of the counter expresses the activity rate of the cache memory 230a. The memory activity rate determination section 802a compares the activity rate, which is obtained this manner, with the respective threshold level values to determine: whether the memory activity rate is a first threshold level value or less; or whether the memory activity rate exceeds the first threshold level value and is a second threshold level value or less, or it exceeds the second threshold level value. Accordingly it is possible to determine to which level among the low, medium, and high levels the cache memory activity rate corresponds. The memory activity rate determination section 802a determines the degree of the activity rate accordingly. The inter-device copy transmission controller 226a sends a result of determining the activity rate to the master side device 200.

Figures 3, 4:
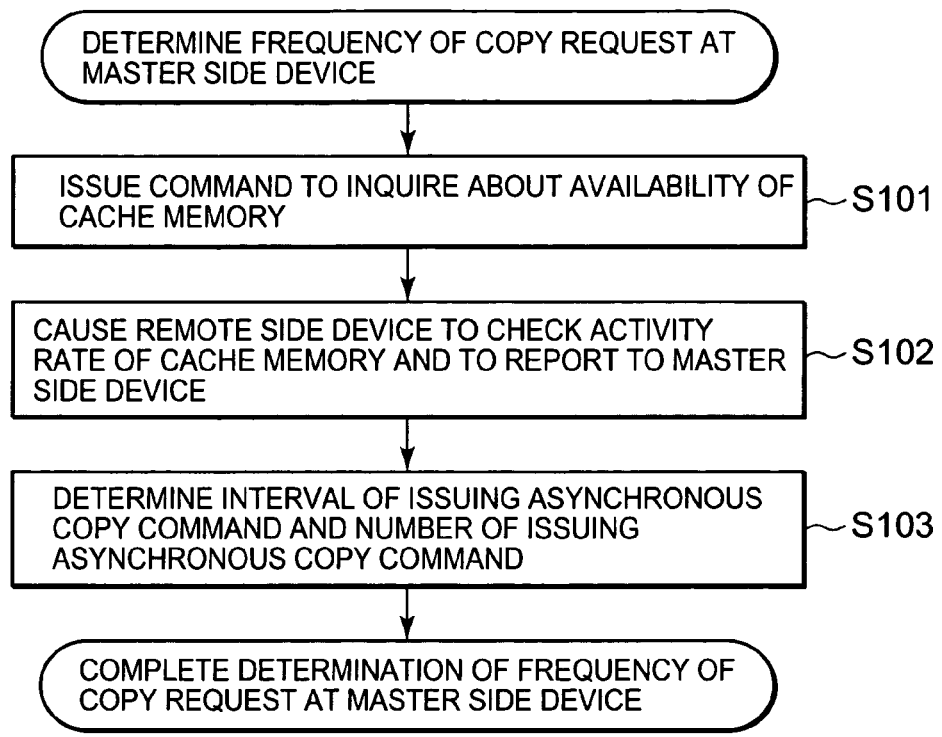
FIG. 3 is a flowchart showing an example of the procedure of determining the request frequency of a copy command of the master side device of the present invention.
FIG. 4 is a table showing an example of the table to which a remote side device status monitoring section of the present invention refers.
Figure 5:
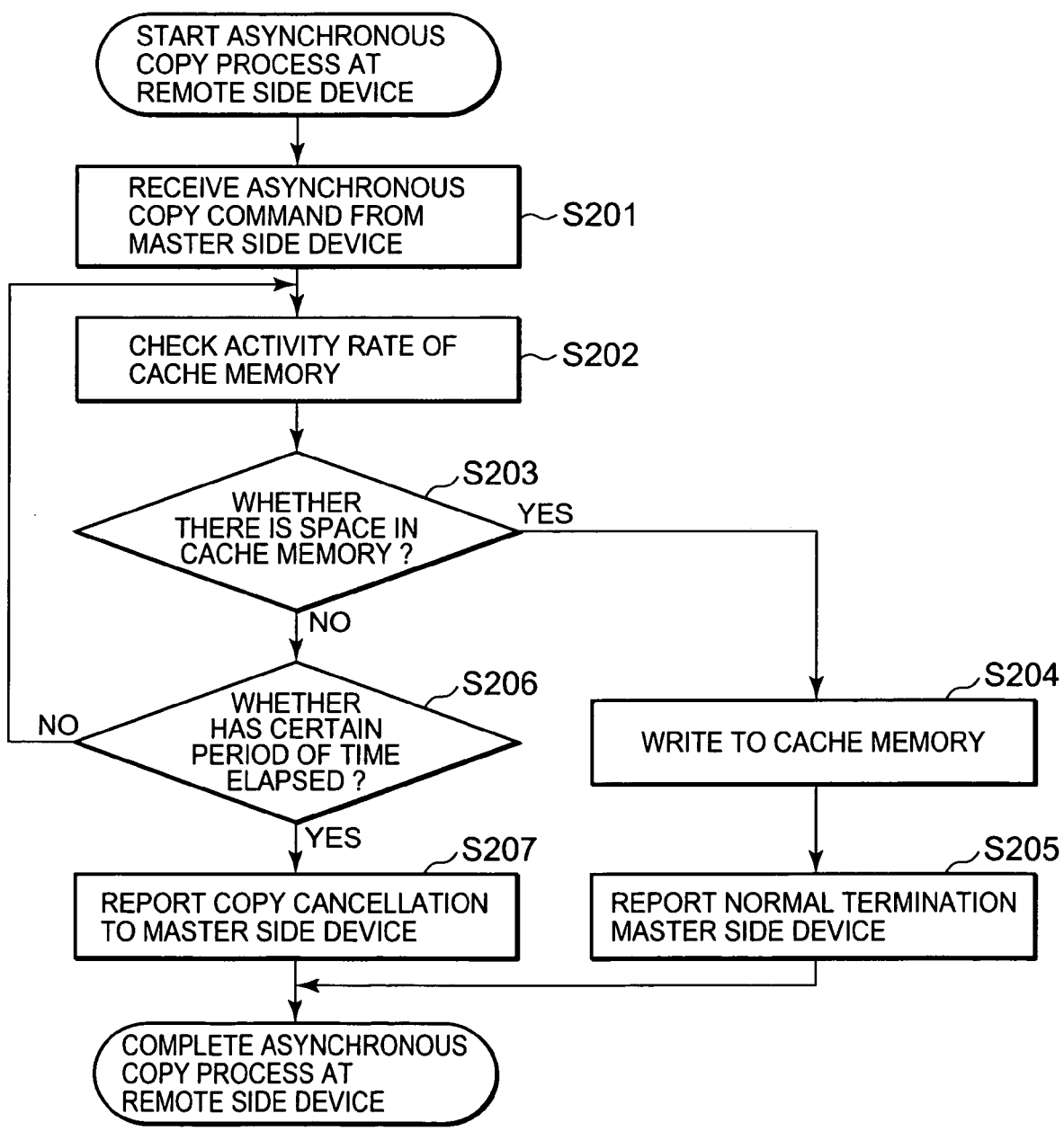
FIG. 5 is a flowchart showing an example of the procedure of an asynchronous copy process of the remote side device of the present invention.
Figure 6:
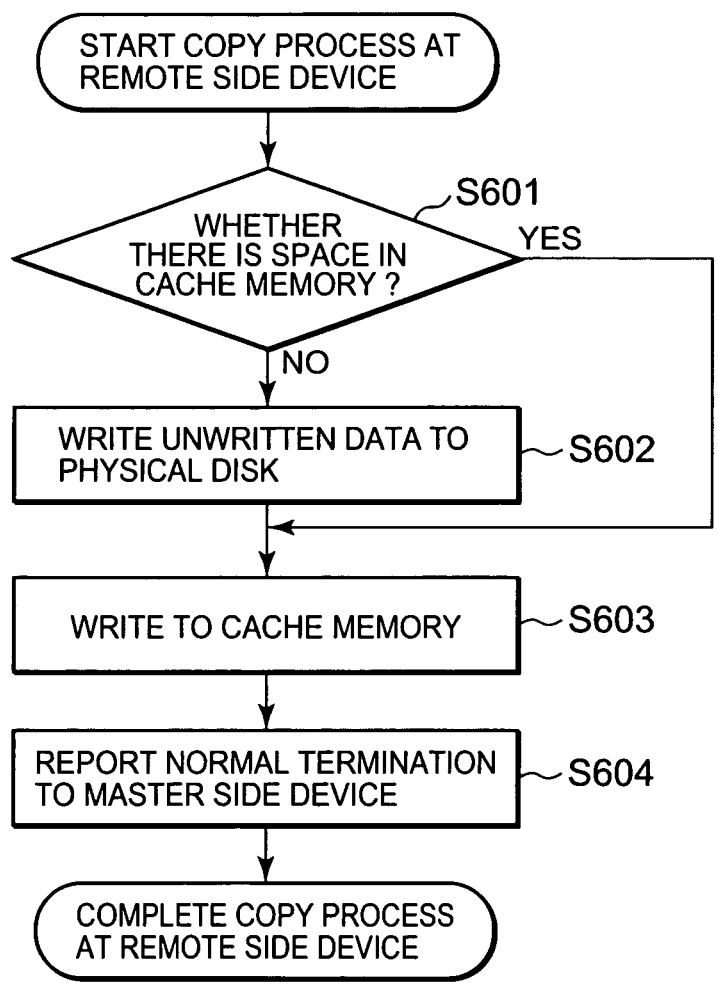
FIG. 6 is a flowchart showing an example of the procedure of a remote side copy process of a conventional technique.

The remote side device status monitoring section 221 of the master side device 200 determines the execution interval of the asynchronous copy and the maximum execution number N by referring to the table of FIG. 4 on the basis of the obtained information on the degree of the activity rate of the cache memory 230a of the remote side device 200a.

Figure 7:
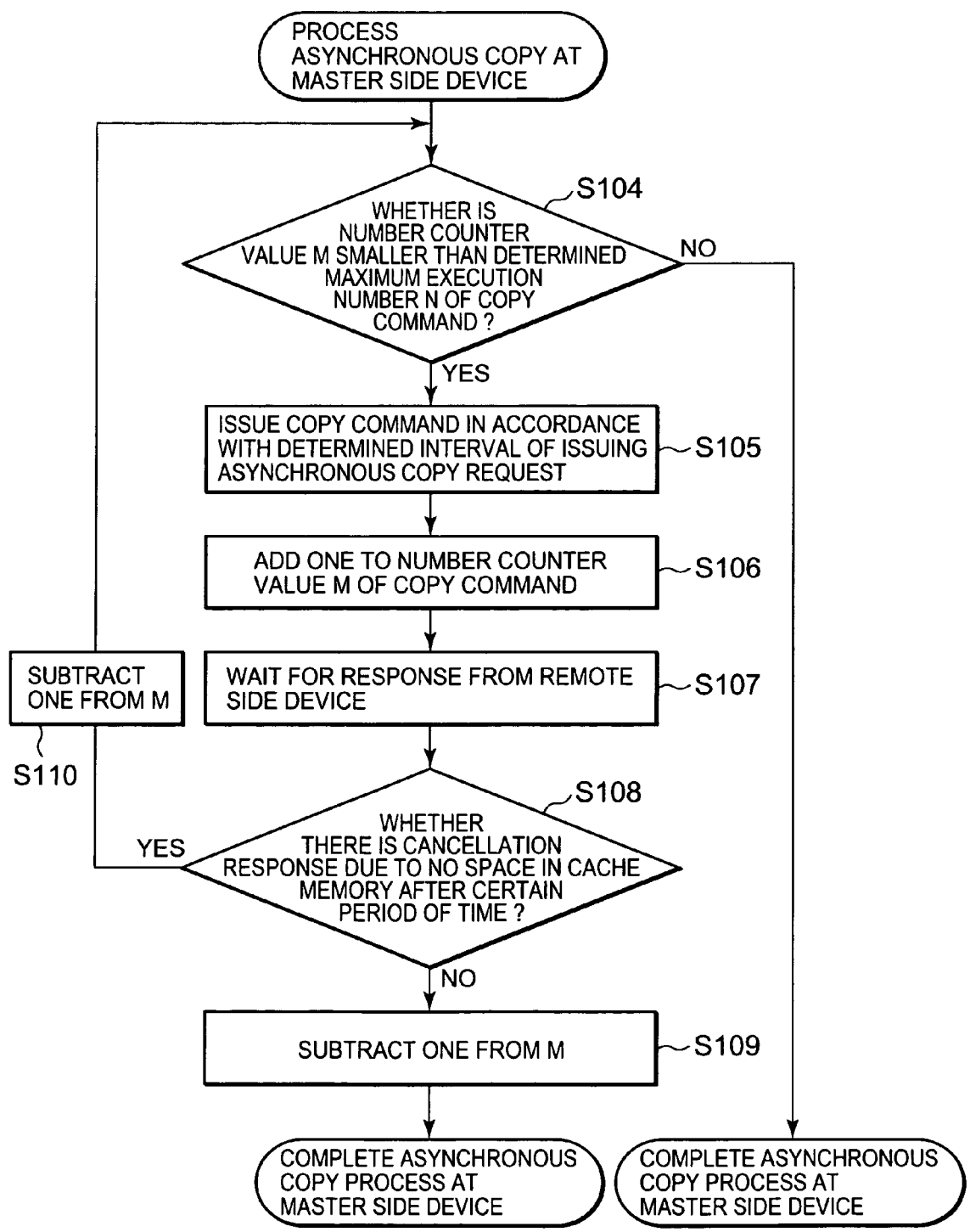
FIG. 7 is a flowchart showing an example of an asynchronous copy process of the master side device of the present invention.

The execution interval of the asynchronous copy can be adjusted by changing the setting of an unillustrated timer which determines the execution interval, or the like. The execution number of the asynchronous copy can be controlled so as to be at the maximum number N or less as shown in FIG. 7.

Next, the operation of the embodiment of the present invention is described in detail with reference to the accompanying drawings. The synchronous copy method and the asynchronous copy method may coexist.

First, descriptions will be provided for the operation which determines the asynchronous copy execution interval of the master side device 200 with reference to FIG. 2 and FIG. 3. The remote device side status monitoring section 221 of the master side device 200 periodically issues, to the remote side device 200a via the inter-device copy transmission controller 226a, a command to inquire about the activity rate of the cache memory 230a (S101). The cache memory status monitoring section 225a of the remote side device 200a, when receiving this command, checks the activity rate of the cache memory 230a, and reports to the master side device 200 (S102).

The remote side device status monitoring section 221 of the master side device 200 monitors the obtained information on the activity rate of the cache memory 230a of the remote side device, and determines the execution interval of the asynchronous copy and the maximum execution number N on the basis of the above information 200a by referring to the table of FIG. 4 (S103).

The execution number means the number of copy commands which have been issued but not yet terminated at one point in time. And the maximum execution number means the allowed maximum execution number. For example, when the maximum execution number is set at 3, the storage device 200 at the master side issues a copy command repeatedly until the number of issued but not yet terminated commands is 3. However, after the number of un-terminated commands reaches 3, the copy command is not issued until the response of normal termination is received, and the next copy command is issued only after the response of normal termination is received.

The execution number is grasped as follows, for example. In the asynchronous copy controller 222 of the master side storage device 200, an unillustrated number counter is prepared. The number counter counts up the numbers when the copy command is issued to the storage device 200a at the remote side, and counts down the numbers when a response is returned from the storage device 200a at the remote side. In this manner, the value of the number counter expresses the execution number.

FIG. 4 is an example of the table to which the remote side device status monitoring section 221 refers. For example, when the activity rate of the cache memory 230a of the remote side device is low, the interval of issuing the asynchronous copy is shortened, and the maximum execution number is increased. When the activity rate of the cache memory 230a of the remote side device is high, the interval of issuing the asynchronous copy is prolonged, and the maximum execution number is decreased. Thereby, the load of the asynchronous copy process is adjusted.

Next, the operation of the asynchronous copy process of the master side device is described in detail with reference to FIG. 7.

The asynchronous copy controller 222 determines whether the value M of the number counter at a given time is smaller than the maximum execution number N of the copy command (S104). When the value M of the number counter at the time is not smaller than the maximum execution number N of the copy command (NO at S104), the copy command is not issued, and the asynchronous copy process of the master side storage device 200 is complete. When the value M of the number counter is smaller than the maximum execution number N of the copy command (YES at S104), the asynchronous copy controller 222 issues a command of copy request to the remote side device on the bases of the interval of issuing and the maximum execution number N, which are determined by the remote device side status monitoring section 221, as described above (S105).

The asynchronous copy controller 222 adds one to the number counter value M after issuing the command (S106).

Subsequently, the asynchronous copy controller 222 waits for a response from the remote side device (S107). When the response from the remote side device 200a is of a normal termination (NO at S108), the asynchronous copy controller 222 subtracts one from the number counter value M (S109) because the number of un-terminated commands decreases. Then the copy process is terminated. This terminates the asynchronous copy process of the master side device 200. When the response from the remote side device 200a is a cancellation response due to the fact that there is no space in the cache memory 230a (YES at S108), the asynchronous copy controller 222 subtracts one from the number counter value M (S110). Thereafter, the asynchronous copy controller 222 determines whether the value M of the number counter at the time is smaller than the maximum execution number N of the copy command (S104). In a case where the value M is smaller than the maximum execution number N (YES at S104), the asynchronous copy controller 222 again issues the relevant copy command (S105), and the above described steps is repeated thereafter.

Next, the operation of the asynchronous copy process of the remote side device 200a is described with reference to FIG. 2 and FIG. 10. When an asynchronous copy command is received from the master side device 200 (S201), the cache memory status monitoring section 225a of the remote side device 200a checks the activity rate of the cache memory 230a, and reports the result thereof to the master side device 200 and the write controller 224a (S202). When there is a space in the cache memory 230a (YES at S203), the write controller 224a immediately writes to the cache memory 230a thus, executes the asynchronous copy command (S204). When the write is complete, the write controller 224a returns, to the master side device, a response of normal termination of the asynchronous copy process (S205). When there is no space in the cache memory 230a (NO at S203), the write controller 224a stands by, and waits for a predetermined period of time (NO at S206). When there is no space in the cache memory 230a after having waited for a predetermined period of time (YES at S206), the write controller 224a returns, to the master side device, a cancellation response due to the fact that there is no space in the cache memory 230a, without carrying out the write process (S207).

Note that a program stored in a record medium, such as unillustrated ROM (read only memory), which exists in each storage device, may cause an unillustrated computer to execute the operation of each of storage devices 200 and 200a described above.

In the above-described embodiment, the load in the asynchronous copy process is adjusted in accordance with the activity rate of the entire cache memory 230a of the remote side device 200a. However, the present invention is not limited to such embodiment, and the activity rate of the cache memory may be managed, for example, in units of volume of the physical disks of the remote side device 200a, or in units of group of the physical disks constituting RAID so that the load of the asynchronous copy process may be adjusted in units of volume or in units of group of the physical disks. Moreover, although in the embodiment, the master side device 200 periodically issues, to the remote side device 200a, a command to inquire about the activity rate of the cache memory, the remote side device 200a may periodically report the activity rate of the cache memory thereof to the master side device 200. Although in the embodiment, the master side device 200 is connected to the remote side device 200a on one-to-one basis, one-to-multiple, multiple-to-one, multiple-to-multiple connection basis configurations may also be employed.

What is claimed is:

1. A storage system comprising:
 a remote side storage device comprising a first cache memory; and
 a master side storage device comprising:
 a second cache memory;
 a host interface controlling section constructed and arranged so as to input data from a first host computer and store said data to said second cache memory;
 an asynchronous copy controller constructed and arranged so as to issue requests for asynchronous copying of said data to said first cache memory in said remote side storage device;
 a synchronous copy controller constructed and arranged so as to issue requests for synchronous copying of said data to said first cache memory in said remote side storage device;
 wherein the master side storage device further comprises a remote side status monitoring section constructed and arranged to monitor an activity rate of said first cache memory and to adjust an asynchronous copy load based on said activity rate of said first cache memory.

2. The storage system according to claim 1, wherein said remote side status monitoring section adjusts an interval of said asynchronous copying in accordance with said activity rate of said first cache memory.

3. The storage system according to claim 2, wherein said remote side status monitoring section prolongs said interval when said activity rate of said first cache is high.

4. The storage system according to claim 1, wherein said remote side status monitoring section adjusts a maximum number of un-terminated requests for said asynchronous copying based on said activity rate of said first cache memory.

5. The storage system according to claim 4, wherein said remote side status monitoring section decreases said maximum number when said activity rate of the first cache is high.

6. The storage system according to claim 1, wherein said remote side storage device further comprises:
 a cache memory status monitoring section constructed and arranged to check the activity rate of said first cache memory; and
 a write controller constructed and arranged to execute said asynchronous copies requested by said master side device when there is a space in said first cache memory.

7. The storage system according to claim 6 wherein said write controller is constructed and arranged to cancel said asynchronous copies when there is no space in said first cache memory for a predetermined period of time.

8. A master side storage device comprising:
 an asynchronous copy controller constructed and arranged to issue requests for asynchronous copying of data to be created on a remote side storage device, the remote side storage device being separate from the master side storage device and comprising a cache memory;
 a synchronous copy controller constructed and arranged to issue requests for synchronous copying of said data to be created on said remote side storage device; and
 a remote side status monitoring section constructed and arranged to monitor an activity rate of said cache memory and to adjust an asynchronous copy load based on said activity rate of said cache memory.

9. A remote side storage device comprising:
 a cache memory; and
 a cache memory status monitoring section which is constructed and arranged to check an activity rate of said cache memory;
 wherein said remote side storage device is constructed and arranged to issue data describing said activity rate of said cache memory upon request, so that when the activity rate is requested by a master side storage device having an asynchronous copy controller designed to request asynchronous copying of data inputted from a first host computer on said cache memory in said remote side storage device, and a synchronous copy controller designed to request synchronous copying of data inputted from said first computer on said cache memory in said remote side storage device, a remote side status monitoring section further provided in the master side storage device monitors said activity rate of said cache memory issued by said remote side storage device and adjust an asynchronous copy load based on said activity rate of said cache memory monitored by said remote side status monitoring section.

10. The remote side storage device according to claim 9 further comprising:
 a write controller which creates said asynchronous copies requested by said master side device when there is a space in said cache memory.

11. A computer system, comprising:
 said storage system according to claim 1, wherein
 said remote side storage device comprises:
 a host interface controlling section constructed and arranged so as to input data from a second host computer and store said data to said first cache memory;
 an asynchronous copy controller constructed and arranged so as to issue requests for asynchronous copying of said data to said second cache memory in said master side storage device;

a synchronous copy controller constructed and arranged so as to issue requests for synchronous copying of said data to said second cache memory in said master side storage device;

wherein the remote side storage device further comprises a remote side status monitoring section constructed and arranged to monitor an activity rate of said second cache memory and to adjust an asynchronous copy load based on said activity rate of said second cache memory:

said first host computer connected to said master side storage device; and said second host computer connected to said remote side storage device.

12. A data copy method comprising:

inputting data from a first host computer and storing said data to a second cache memory of a master side storage device;

requesting asynchronous copying of said data to be made on a first cache memory on a remote side storage device;

requesting synchronous copying of said data to be made on said first cache memory on said remote side storage device;

monitoring an activity rate of said first cache memory of said remote side storage device; and adjusting an asynchronous copy load based on said activity rate of said first cache memory.

13. The data copy method according to claim 12, wherein the adjusting comprises adjusting an interval of said asynchronous copying based on said activity rate of said first cache memory.

14. The data copy method according to claim 13, wherein adjusting the interval of the requesting asynchronous copying comprises prolonging said interval of said requesting asynchronous copying when said activity rate of said first cache is higher than a predetermined threshold.

15. The data copy method according to claim 12, wherein the adjusting comprises adjusting a maximum number of un-terminated said asynchronous copies.

16. The data copy method according to claim 15, wherein adjusting the maximum number of un-terminated said asynchronous copies comprises decreasing said maximum number when said activity rate of the first cache is higher than a predetermined threshold.

17. The data copy method according to claim 12, further comprising:

checking the activity rate of said first cache memory; and executing said requesting asynchronous copying by said master side device when there is a space in said cache memory.

18. The data copy method according to claim 17, further comprising:

canceling said requesting asynchronous copying when there is no space in said first cache memory for a predetermined period of time.

19. A computer readable storage medium storing in a non-transitory manner thereon a control program enabling a computer to execute said data copy method according to claim 12.

* * * * *